(12) United States Patent
Irwin

(10) Patent No.: US 6,647,037 B2
(45) Date of Patent: Nov. 11, 2003

(54) LASER DIODE ARRAY

(76) Inventor: Timothy L. Irwin, 145 Penn La., Rochester, NY (US) 14625

(*) Notice: Subject to any disclaimer, the term of this patent is extended or adjusted under 35 U.S.C. 154(b) by 63 days.

(21) Appl. No.: 09/862,836

(22) Filed: May 23, 2001

(65) Prior Publication Data

US 2002/0175714 A1 Nov. 28, 2002

(51) Int. Cl.[7] .......................... H01S 3/04; H01S 3/091; H01S 3/094
(52) U.S. Cl. .......................................... 372/36; 372/75
(58) Field of Search ..................... 372/34–36, 43–50, 372/75; 174/16.3; 228/124.1

(56) References Cited

U.S. PATENT DOCUMENTS 3,829,598 A * 8/1974 Darnell ...................... 174/16.3
4,645,117 A * 2/1987 Knapp et al. ............ 228/124.1
5,627,850 A * 5/1997 Irwin et al. .................. 372/43

* cited by examiner

*Primary Examiner*—Quyen Leung
(74) *Attorney, Agent, or Firm*—Robert J. Bird

(57) ABSTRACT

A process of making a laser diode device includes these steps: applying a bonding layer such as molybdenum manganese to surfaces of first and second bodies of dielectric material such as beryllium oxide; joining the first and second bodies together to form a cavity; and bonding a sectored conductor ring to the bonding layer within the cavity.

Figure 1:
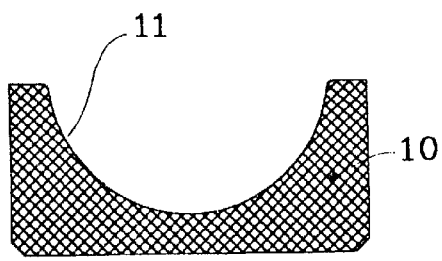

The laser diode device made by the process includes a body of dielectric material such as beryllium oxide forming a cavity; a bonding layer lining the cavity; a conductor bonded to the layer within the cavity; the conductor being divided into ring sectors separated by radial diode bar spaces; and a laser diode bar in each of the bar spaces forming an array of such laser diode bars. The ring sectors and laser diode bars together form a series path for electric current around the conductor to energize the laser diode bars.

3 Claims, 1 Drawing Sheet

LASER DIODE ARRAY

BACKGROUND OF THE INVENTION

1. Technical Field

This invention relates to a laser diodes mounted in an array, surrounding a laser medium for excitation thereof, and particularly to the fabrication and structure of the surrounding array.

2. Background Information and Disclosure

Excitation of a laser medium from an adjacent or surrounding array of laser diodes is known in the prior art.

U.S. Pat. No. 5,033,058 to Cabaret et al discloses a laser rod in a glass tube with a segmented reflective coating. Laser diodes placed around the glass tube emit through windows in the reflective coating to excite the laser rod.

U.S. Pat. No. 5,040,187 to Karpinski, and U.S. Pat. No. 5,128,951 to Karpinski both disclose flat laser diode arrays mounted in a ceramic substrate with a metallized surface. Current through the metallized surface energizes the laser diodes, which then excite an adjacent laser medium, not shown in the patents.

U.S. Pat. No. 5,521,936 to Irwin discloses a radial array of laser diodes mounted in a sectored conductive ring surrounding a laser rod. An inner tube forms a coolant channel around the laser rod, and an outer sleeve forms a coolant channel around the ring and the laser diodes.

The most relevant prior art that I know of is U.S. Pat. No. 5,627,850 to Irwin et al. It discloses a laser diode array which includes a dielectric block with a conductor layer "direct bonded" to it. The conductor layer is divided into sectors by spaced diode bar spaces. A laser diode bar is positioned in each space. The conductor layer and laser diode bars together surround a laser medium which is excited by the laser diode bars.

SUMMARY OF THE INVENTION

This invention is a laser diode device, and a process of making it. The process includes these steps: applying a bonding layer such as molybdenum manganese to surfaces of first and second bodies of dielectric material such as beryllium oxide; joining the first and second bodies together to form a cavity; and bonding a sectored conductor ring to the bonding layer within the cavity.

The device includes a body of dielectric material such as beryllium oxide forming a cavity; a bonding layer lining the cavity; a conductor bonded to the layer within the cavity; the conductor being divided into ring sectors separated by radial diode bar spaces; and a laser diode bar in each of the bar spaces forming an array of such laser diode bars. The ring sectors and laser diode bars together form a series path for electric current around the conductor to energize the laser diode bars.

DRAWING

FIGS. 1–6 are cross-sectional views of various stages of fabrication of a laser and diode array according to this invention.

DESCRIPTION

The following is a description of the fabrication of a laser diode array according to this invention.

FIG. 1 shows a lower block 10 of dielectric material, preferably beryllium oxide (BeO). The block 10 includes a cavity 11 which is semi-cylindrical in the example shown.

Figure 2:
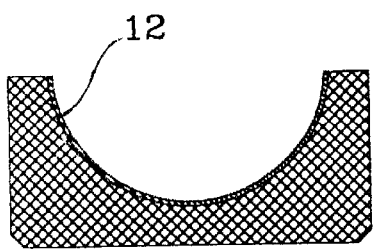

FIG. 2 shows the semi-cylindrical cavity lined with a layer of bonding material 12, preferably molybdenum manganese (MoMn). The bonding layer 12 is a metalized coating applied by painting, spraying, sintering, or screen printing on the BeO surface.

Figure 3:
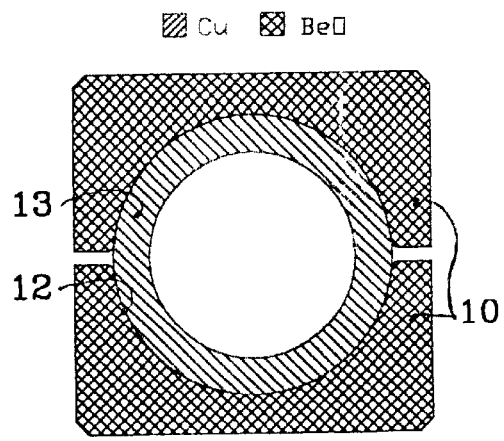

FIG. 3 shows a conductor ring 13 mounted in the semi-cylindrical cavity of the lower block 10, and bonded to its bonding layer 12, preferably by copper-silver solder. An upper block 10, similar to the lower block and inverted relative to it, is mounted over the conductor ring 13 which is then is similarly bonded to the upper block 10.

Figure 4:
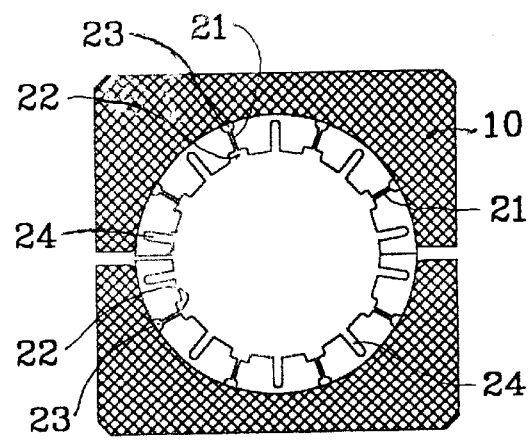

FIG. 4 shows the conductor ring 13 including a number of radial diode bar spaces 21, dividing the ring 13 into a plurality of ring sectors 20a, 20b, 20c, etc. (see also FIG. 5). The diode bar spaces 21 may be expanded at their radial inner and outer ends 22, 23. The ring sectors may each include a stress relief groove 24.

Figure 5:
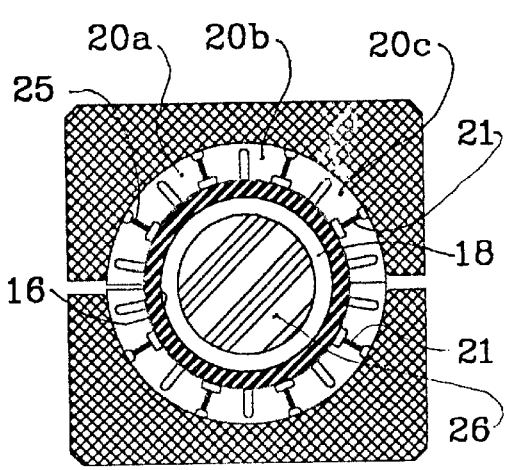

FIG. 5 shows a laser diode bar 25 mounted in each bar space 21, a coolant tube 16 of a dielectric material mounted within the conductor ring 13, and a laser medium 26 mounted and centered within the coolant tube 16, whereby laser and tube together form an annular coolant flow channel 18 around the laser medium 26. The channel 18 is a conduit for water to remove heat from the laser medium 26. The laser diode bars 25 are held in the bar spaces 21, preferably by solder. The ring sectors 20 and laser diode bars 25 mounted between them together form a series path for electric current around the conductor ring 13.

Figure 6:
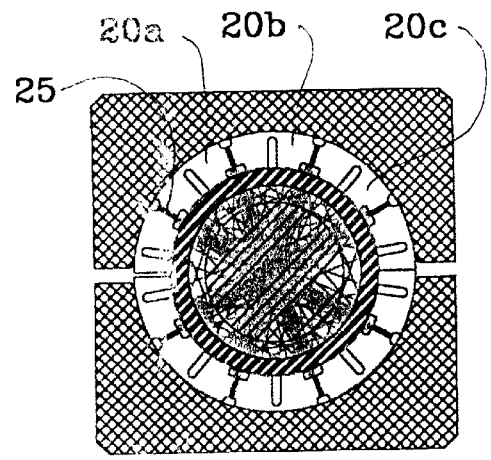

FIG. 6 shows the device of FIG. 5 in operation. With electric current through successive ring sectors 20 and laser diodes 25 mounted between them, the laser diodes 25 emit light which in turn energizes the laser medium 26. FIG. 6 also shows the symmetry of pumping action produced by the array of laser diodes.

The bonding layer 12 between the dielectric blocks 10 and the conductor ring 13 is an improvement over the "direct bond copper" technique disclosed in U.S. Pat. No. 5,627,850, discussed above. The bonding layer 12 forms a stronger, more reliable bond with the BeO blocks.

In the devices described, the conductor ring 13 is preferably copper because of its thermal and electrical conductivity, and the blocks 10 are preferably beryllium oxide because it is a thermally conductive dielectric. Some other ceramic or oxide such as alumina could be used, for example in a configuration where thermal conductivity of the block is not so important.

The foregoing description of a preferred embodiment of this invention sets forth the best mode contemplated by the inventor of carrying out this invention. Specific details as to materials, quantities, dimensions, and the like are intended as illustrative and not limiting, except as limited by the following claims. The concept and scope of the invention are limited only by the following claims and equivalents thereof.

What is claimed is:

1. A laser diode device, including:
    lower and upper blocks of dielectric material, each said block defining a semi-cylindrical cavity;

a bonding layer of molybdenum manganese lining each said cavity, each said layer being of macroscopic thickness;

said upper block inverted relative to said lower block and mounted thereon to define therewith a cylindrical cavity;

a cylindrical copper ring disposed within said cylindrical cavity and bonded to said bonding layers of said lower and upper blocks, said copper ring including a plurality of separate ring sectors with radial diode bar spaces between adjacent sectors, the copper of said ring being of a thickness substantially greater than the thickness of said bonding layers; and a laser diode bar disposed in each of said bar spaces in a circumferential array of said laser diode bars;

said ring sectors and said laser diode bars together forming a series path for electric current around said copper ring to energize said laser diode bars.

2. A laser diode device as defined in claim 1, in which said dielectric material is beryllium oxide.

3. A laser diode device as defined in claim 1, in which said copper ring is bonded to said bonding layers by copper-silver solder.

* * * * *